(12) United States Patent
Kang et al.

(10) Patent No.: US 11,505,728 B2
(45) Date of Patent: *Nov. 22, 2022

(54) ADHESIVE COMPOSITION AND POLARIZING PLATE COMPRISING ADHESIVE LAYER FORMED USING SAME

(71) Applicant: SHANJIN OPTOELECTRONICS (SUZHOU) CO., LTD., Zhangjiagang (CN)

(72) Inventors: Seongwook Kang, Daejeon (KR); Jin Woo Kim, Daejeon (KR); Dong Uk Kim, Daejeon (KR); Yoonkyung Kwon, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 369 days.

This patent is subject to a terminal disclaimer.

(21) Appl. No.: 16/649,272

(22) PCT Filed: Sep. 20, 2018

(86) PCT No.: PCT/KR2018/011109
§ 371 (c)(1),
(2) Date: Mar. 20, 2020

(87) PCT Pub. No.: WO2019/059667
PCT Pub. Date: Mar. 28, 2019

(65) Prior Publication Data
US 2020/0291278 A1    Sep. 17, 2020

(30) Foreign Application Priority Data
Sep. 22, 2017    (KR) .......................... 10-2017-0122407

(51) Int. Cl.
*C09J 163/00*    (2006.01)
*C09J 7/30*    (2018.01)
(Continued)

(52) U.S. Cl.
CPC ............... *C09J 163/00* (2013.01); *B32B 7/12* (2013.01); *B32B 27/08* (2013.01); *B32B 27/28* (2013.01);
(Continued)

(58) Field of Classification Search
CPC ........... B32B 7/12; B32B 27/08; B32B 27/28; B32B 27/306; B32B 2255/10;
(Continued)

(56) References Cited

U.S. PATENT DOCUMENTS

2009/0181263 A1    7/2009    Yokota et al.
2013/0244041 A1    9/2013    Cho et al.
(Continued)

FOREIGN PATENT DOCUMENTS

CN    103108931 A    5/2013
JP    4135119 B2    8/2008
(Continued)

OTHER PUBLICATIONS

International Search Report for Application No. PCT/KR2018/011109 dated Mar. 18, 2019, 3 pages.
(Continued)

*Primary Examiner* — Eli D. Strah
(74) *Attorney, Agent, or Firm* — Schmeiser, Olsen & Watts, LLP

(57) ABSTRACT

An adhesive composition and a polarizing plate including an adhesive layer formed using the same are disclosed herein. In some embodiments, an adhesive composition includes 3-ethyl-3-(2-ethylhexyloxy)methyloxetane, 3-ethyl-3-hydroxymethyloxetane, 3,3'-oxybis(methylene)bis(3-ethyl-
(Continued)

oxetane), an aromatic epoxy compound, and an alicyclic epoxy compound, wherein the 3-ethyl-3-(2-ethylhexyloxy) methyloxetane is present in an amount of 20 parts by weight to 50 parts by weight, the 3-ethyl-3-hydroxymethyloxetane is present in an amount of 2 parts by weight to 8 parts by weight, the 3,3'-oxybis(methylene)bis(3-ethyloxetane) is present in an amount of 2 parts by weight to 8 parts by weight, the aromatic epoxy compound is present in an amount of 7 parts by weight to 38 parts by weight, and the alicyclic epoxy compound is present in amount of 10 parts by weight to 50 parts by weight, based on 100 parts by weight of the adhesive composition.

10 Claims, 1 Drawing Sheet

(51) Int. Cl.
| | |
|---|---|
| *G02B 1/14* | (2015.01) |
| *B32B 27/08* | (2006.01) |
| *B32B 7/12* | (2006.01) |
| *B32B 27/30* | (2006.01) |
| *B32B 27/28* | (2006.01) |
| *G02B 5/30* | (2006.01) |
| *C08G 65/18* | (2006.01) |
| *C09J 171/02* | (2006.01) |
| *C08G 65/22* | (2006.01) |

(52) U.S. Cl.
CPC ............ *B32B 27/306* (2013.01); *C08G 65/18* (2013.01); *C09J 7/30* (2018.01); *C09J 171/02* (2013.01); *G02B 1/14* (2015.01); *G02B 5/30* (2013.01); *B32B 2255/10* (2013.01); *B32B 2255/26* (2013.01); *B32B 2457/20* (2013.01); *B32B 2457/202* (2013.01); *B32B 2457/206* (2013.01); *C08G 65/223* (2013.01); *C09J 2203/318* (2013.01); *C09J 2433/008* (2013.01); *C09J 2463/00* (2013.01); *C09K 2323/055* (2020.08); *C09K 2323/057* (2020.08); *Y10T 428/31511* (2015.04)

(58) Field of Classification Search
CPC . B32B 2255/26; B32B 2457/20; C08G 65/18; C08G 65/223; C08G 65/226; C09J 7/20; C09J 7/30; C09J 11/06; C09J 163/00; C09J 171/02; C09J 2203/318; C09J 2433/008; C09J 2463/00; C09K 2323/055; C09K 2323/057; G02B 1/14; G02B 5/30; G02B 5/3033; Y10T 428/31511
See application file for complete search history.

(56) References Cited

U.S. PATENT DOCUMENTS

| | | | |
|---|---|---|---|
| 2014/0072731 A1 | 3/2014 | Seo et al. | |
| 2015/0099127 A1 | 4/2015 | Ogawa et al. | |
| 2020/0291279 A1* | 9/2020 | Kang | G02B 5/30 |
| 2021/0024792 A1* | 1/2021 | Kim | C09J 163/00 |

FOREIGN PATENT DOCUMENTS

| | | | | |
|---|---|---|---|---|
| JP | 2009120632 A | 6/2009 | | |
| JP | 2011236389 A | 11/2011 | | |
| JP | 2014129431 A | 7/2014 | | |
| JP | 2018025771 A | 2/2018 | | |
| KR | 20100100602 A | 9/2010 | | |
| KR | 20100100695 A | * 9/2010 | ............ | C09J 163/00 |
| KR | 20100100695 A | 9/2010 | | |
| KR | 20120044237 A | 5/2012 | | |
| KR | 20130040725 A | 4/2013 | | |
| KR | 20130103290 A | 9/2013 | | |
| KR | 20170041634 A | 4/2017 | | |
| WO | 2014058042 A1 | 4/2014 | | |

OTHER PUBLICATIONS

Taiwan Search Report for Application No. 107133278 dated Jul. 31, 2019, 1 page.

* cited by examiner

[FIG. 1]
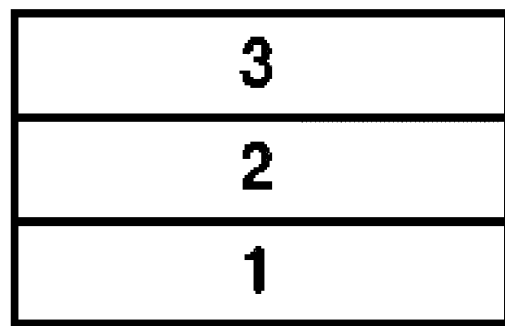
[FIG. 2]
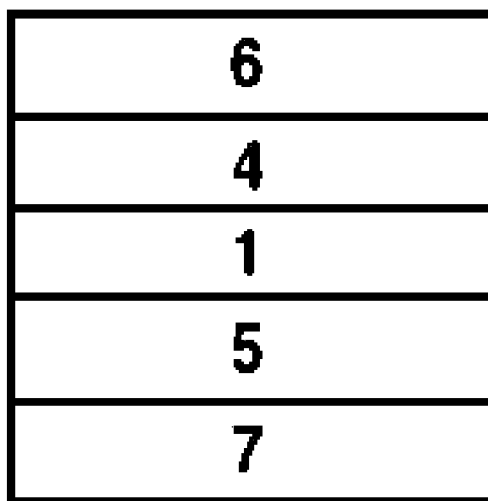

ADHESIVE COMPOSITION AND POLARIZING PLATE COMPRISING ADHESIVE LAYER FORMED USING SAME

CROSS-REFERENCE TO RELATED APPLICATION(S)

The present application is a national phase entry under 35 U.S.C. § 371 of International Application No. PCT/KR2018/011109, filed on Sep. 20, 2018, which claims priority from Korean Patent Application No. 10-2017-0122407, filed on Sep. 22, 2017, the disclosures of which are incorporated by reference herein.

TECHNICAL FIELD

The present specification relates to an adhesive composition, and a polarizing plate including an adhesive layer formed using the same.

This application claims priority to and the benefits of Korean Patent Application No. 10-2017-0122407, filed with the Korean Intellectual Property Office on Sep. 22, 2017, the entire contents of which are incorporated herein by reference.

BACKGROUND ART

Polarizing plates have been commonly used in a structure of a protective film being laminated on one surface or both surfaces of a polarizer formed with a polyvinyl alcohol (hereinafter, referred to as 'PVA')-based resin dyed with dichroic dye or iodine using an adhesive. Triacetyl cellulose (TAC)-based films have been normally used as a polarizing plate protective film in the art, however, such TAC films have a problem of being readily deformed under high temperature and high humidity environments. Accordingly, protective films made of various materials capable of replacing TAC films have been recently developed, and for example, a method of using polyethylene terephthalate (PET), a cycloolefin polymer (COP), an acryl-based film or the like either alone or as a mixture thereof has been proposed.

Herein, as an adhesive used for attaching the polarizer and the protective film, water-based adhesives formed with an aqueous solution of a polyvinyl alcohol-based resin have been normally used. However, the water-based adhesive has weak adhesive strength when using an acryl-based film or a COP film as a protective film instead of TAC, which causes a problem in that the use is limited depending on the film material. In addition, as well as a problem of adhesive strength defects depending on the material, the water-based adhesive causes problems such as curl occurrences and initial optical property decline on a polarizing plate due to a drying process of the water-based adhesive when using different protective film materials on both surfaces of a PVA element. Moreover, when using the water-based adhesive, a drying process is essential, and in such a drying process, differences in moisture permeability, thermal expansion and the like occur causing a problem of increasing a defect rate. As an alternative to such problems, methods of using a non-water-based adhesive instead of a water-based adhesive have been proposed.

Non-water-based adhesives for a polarizing plate that have been proposed so far may be divided into radical curable adhesives and cation curable adhesives according to the curable methods. Cation curable adhesives have an advantage of having excellent adhesive strength for films made of various materials, but has many disadvantages in manufacturing processes due to a low curing rate and a low degree of curing. In order to resolve such problems of cation curable adhesives, radical curable adhesives having an acrylamide-based compound as a main component have been proposed. However, despite a higher curing rate compared to cation curable adhesives, radical curable adhesives having an acrylamide-based compound as a main component have problems in that a curing rate decreases under a high humidity atmosphere, and adhesive strength decreases. Meanwhile, a process for manufacturing a polarizing plate has a high water content since it includes a wet process in which swelling, dyeing, stretching and the like of a polyvinyl alcohol film are performed in an aqueous solution, and accordingly, further processes such as hot air drying or surface treating with plasma need to be performed on a polarizer before adhesive coating in order to use the acrylamide-based adhesive in the polarizing plate.

Accordingly, development of adhesives without decreasing a curing rate and adhesive strength even under a high humidity environment has been required so as to be used in a polarizing plate without further treatments.

BRIEF SUMMARY OF THE INVENTION

Technical Problem

The present specification is directed to providing an adhesive composition, and a polarizing plate including an adhesive layer formed using the same.

Technical Solution

One embodiment of the present specification provides an adhesive composition including 3-ethyl-3-(2-ethylhexyloxy)methyloxetane, 3-ethyl-3-hydroxymethyloxetane, 3,3'-oxybis(methylene)bis(3-ethyloxetane), an aromatic epoxy compound and an alicyclic epoxy compound, wherein the 3-ethyl-3-(2-ethylhexyloxy)methyloxetane is included in 20 parts by weight to 50 parts by weight, the 3-ethyl-3-hydroxymethyloxetane in 2 parts by weight to 8 parts by weight, the 3,3'-oxybis(methylene)bis(3-ethyloxetane) in 2 parts by weight to 8 parts by weight, the aromatic epoxy compound in 7 parts by weight to 38 parts by weight, and the alicyclic epoxy compound in 10 parts by weight to 50 parts by weight, with respect to 100 parts by weight of the whole adhesive composition.

Another embodiment of the present specification provides a polarizing plate including a polarizer; an adhesive layer provided on at least one surface of the polarizer and formed using the above-described adhesive composition; and a protective film provided on at least one surface of the adhesive layer.

Still another embodiment of the present specification provides an image display device including a display panel; and the above-described polarizing plate provided on one surface or both surfaces of the display panel.

Advantageous Effects

An adhesive composition according to one embodiment of the present specification has excellent water resistance and is thereby capable of stably maintaining adhesive strength even under high temperature immersion.

DESCRIPTION OF DRAWINGS

FIG. 1 illustrates a laminated structure of a polarizing plate according to one embodiment of the present specification.

FIG. 2 illustrates a laminated structure of a polarizing plate according to one embodiment of the present specification.

REFERENCE NUMERAL

1: Polarizer
2, 4, 5: Adhesive Layer
3, 6, 7: Protective Film

DETAILED DESCRIPTION

Hereinafter, the present specification will be described in detail.

In the present specification, a description of a certain part "including" certain constituents means capable of further including other constituents, and does not exclude other constituents unless particularly stated on the contrary.

In the present specification, a description of a certain member being placed "on" another member includes not only a case of the one member adjoining the another member but a case of still another member being present between the two members.

One embodiment of the present specification provides an adhesive composition including 3-ethyl-3-(2-ethylhexyloxy)methyloxetane, 3-ethyl-3-hydroxymethyloxetane, 3,3'-oxybis(methylene)bis(3-ethyloxetane), an aromatic epoxy compound and an alicyclic epoxy compound, wherein the 3-ethyl-3-(2-ethylhexyloxy)methyloxetane is included in 20 parts by weight to 50 parts by weight, the 3-ethyl-3-hydroxymethyloxetane in 2 parts by weight to 8 parts by weight, the 3,3'-oxybis(methylene)bis(3-ethyloxetane) in 2 parts by weight to 8 parts by weight, the aromatic epoxy compound in 7 parts by weight to 38 parts by weight, and the alicyclic epoxy compound in 10 parts by weight to 50 parts by weight, with respect to 100 parts by weight of the whole adhesive composition.

In one embodiment of the present specification, the 3-ethyl-3-(2-ethylhexyloxy)methyloxetane is included in 20 parts by weight to 50 parts by weight and more preferably in 30 parts by weight to 40 parts by weight with respect to 100 parts by weight of the whole adhesive composition. When satisfying the above-mentioned content range, adhesive strength is enhanced by an anchor effect of a long alkyl chain (ethylhexyl group) in the molecule. The content of the 3-ethyl-3-(2-ethylhexyloxy)methyloxetane being less than 20 parts by weight with respect to 100 parts by weight of the whole adhesive composition may not contribute to adhesive strength enhancement, and when the content is greater than 50 parts by weight, a glass transition temperature of the adhesive composition decreases weakening durability.

In one embodiment of the present specification, the 3-ethyl-3-hydroxymethyloxetane and the 3,3'-oxybis(methylene)bis(3-ethyloxetane) are each included in 2 parts by weight to 8 parts by weight and more preferably in 3 parts by weight to 7 parts by weight with respect to 100 parts by weight of the whole adhesive composition. When the adhesive composition of the present specification does not include the 3-ethyl-3-hydroxymethyloxetane or the 3,3'-oxybis(methylene)bis(3-ethyloxetane), adhesive strength and durability decrease. In addition, when the content of the 3-ethyl-3-hydroxymethyloxetane satisfies the above-mentioned content range, adhesive strength is enhanced by hydrogen bonding of the hydroxyl group, and when the content of the 3,3'-oxybis(methylene)bis(3-ethyloxetane) satisfies the above-mentioned content range, durability is enhanced due to a high glass transition temperature.

Specifically, the content of the 3-ethyl-3-hydroxymethyloxetane being less than 2 parts by weight with respect to 100 parts by weight of the whole adhesive composition may not contribute to adhesive strength enhancement, and when the content is greater than 8 parts by weight, adhesive strength decreases, and durability becomes inferior as well since a glass transition temperature of the adhesive composition decreases. When the content of the 3,3'-oxybis(methylene)bis(3-ethyloxetane) is less than 2 parts by weight with respect to 100 parts by weight of the whole adhesive composition, durability becomes inferior, and when the content is greater than 8 parts by weight, adhesive strength decreases.

In one embodiment of the present specification, the aromatic epoxy compound is included in 7 parts by weight to 38 parts by weight, preferably in 10 parts by weight to 30 parts by weight, preferably in 15 parts by weight to 30 parts by weight and more preferably in 20 parts by weight to 25 parts by weight with respect to 100 parts by weight of the whole adhesive composition. When satisfying the above-mentioned content range, a benzene ring of the aromatic epoxy compound increases hydrophobicity of the adhesive enhancing water resistance. Specifically, when the content of the aromatic epoxy compound is less than 7 parts by weight with respect to 100 parts by weight of the whole adhesive composition, an effect of improving water resistance is hot high, and when the content is greater than 38 parts by weight, viscosity becomes high worsening processability.

In addition, when using three types of compounds of the 3-ethyl-3-(2-ethylhexyloxy)methyloxetane, the 3-ethyl-3-hydroxymethyloxetane and the 3,3'-oxybis(methylene)bis(3-ethyloxetane), adhesive strength with a base is more enhanced when using all of the three types compared to when using one oxetane compound of the above-mentioned oxetanes or when using two types of the compounds due to physical bonding with the base by an anchor effect of the 3-ethyl-3-(2-ethylhexyloxy)methyloxetane and hydrogen bonding of the 3-ethyl-3-hydroxymethyloxetane. In addition, the 3,3'-oxybis(methylene)bis(3-ethyloxetane) increases a glass transition temperature of the adhesive composition enhancing durability. Particularly, when using all of the three types, adhesive strength and durability are enhanced compared to when using two types of the compounds.

In one embodiment of the present specification, the aromatic epoxy compound is one or more types selected from the group consisting of novolac-based epoxy, bisphenol A-based epoxy, bisphenol F-based epoxy, brominated bisphenol-based epoxy, phenyl glycidyl ether, o-cresyl glycidyl ether and nonylphenyl glycidyl ether, and the aromatic epoxy compound more preferably has two epoxy groups. Accordingly, diepoxy compounds such as bisphenol F diglycidyl ether or bisphenol A glycidyl ether have superior effects in terms of water resistance and durability.

The alicyclic epoxy-based compound means an epoxy-based compound in which an epoxy group is formed between adjacent two carbon atoms forming an aliphatic hydrocarbon ring, and although not limited thereto, examples thereof may include 2-(3,4-epoxy)cyclohexyl-5,5-spiro-(3,4-epoxy)cyclohexane-m-dioxane, 3',4'-epoxycyclohexylmethyl-3,4-epoxycyclohexane carboxylate, 3,4-epoxy-6-methylcyclohexylmethyl-3,4-epoxy-6-methylcyclohexane carboxylate, vinylcyclohexane dioxide, bis(3,4-epoxycyclohexylmethyl)adipate, bis(3,4-epoxy-6-methylcyclohexylmethyl)adipate, bisepoxycyclopentyl ether, 2,2-bis[4-(2,3-epoxypropoxy)cyclohexyl]propane, 2,6-bis(2,3-epoxypropoxycyclohexyl-p-dioxane), 2,6-bis(2, 3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy) cyclopentylphenyl-2,3-epoxypropyl ether), 1,2-bis[5-(1,2-epoxy)-4,7-hexahydromethanoindanoxyl]ethane cyclopentenyl phenyl glycidyl ether, methylenebis(3,4-epoxycyclohexane)ethylene glycol di(3,4-epoxycyclohexylmethyl) ether, ethylenebis(3,4-epoxycyclohexane carboxylate), ε-caprolactone (1 mol to 10 mol) adducts of 3,4-epoxycyclohexane methanol, ester compounds of multivalent (3 to 20 values) alcohols (GR, TMP, PE, DPE, hexapentaerythritol), and the like. Among these, using 3',4'-epoxycyclohexylmethyl-3,4-epoxycyclohexane carboxylate is particularly preferred in terms of reactivity.

In one embodiment of the present specification, the alicyclic epoxy compound is one or more types selected from the group consisting of 3',4'-epoxycyclohexylmethyl-3,4-epoxycyclohexane carboxylate, vinylcyclohexene dioxide, dicyclopentadiene dioxide and bisepoxycyclopentyl ether.

In one embodiment of the present specification, the alicyclic epoxy compound is 3',4'-epoxycyclohexylmethyl-3,4-epoxycyclohexane carboxylate.

In one embodiment of the present specification, the alicyclic epoxy compound is included in 10 parts by weight to 50 parts by weight with respect to 100 parts by weight of the whole adhesive composition, and when preferably included in 20 parts by weight to 40 parts by weight, adhesive strength and durability are enhanced.

In one embodiment of the present specification, the adhesive composition further includes an aliphatic epoxy compound. When including both an aliphatic epoxy compound and an alicyclic epoxy compound, alicyclic epoxy has a high curing rate and a high glass transition temperature, but has high viscosity, and therefore, may not be added in a large quantity when mixing the adhesive. In addition, although having lower curing rate and glass transition temperature compared to alicyclic epoxy, aliphatic epoxy lowers adhesive viscosity when used together with alicyclic epoxy securing processability, and adhesive strength, a curing rate, a glass transition temperature and the like of the adhesive may be properly controlled.

In one embodiment of the present specification, the aliphatic epoxy compound is included in 1 parts by weight to 30 parts by weight with respect to 100 parts by weight of the whole adhesive composition.

The aliphatic epoxy-based compound means an epoxy-based compound including an aliphatic chain or an aliphatic ring in the molecule, and although not limited thereto, examples thereof may include 1,4-cyclohexane dimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylol propane triglycidyl ether, n-butyl glycidyl ether, 2-ethylhexyl glycidyl ether and the like.

In one embodiment of the present specification, the aliphatic epoxy compound is one or more types selected from the group consisting of 1,4-cyclohexane dimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylol propane triglycidyl ether, n-butyl glycidyl ether and 2-ethylhexyl glycidyl ether.

According to one embodiment of the present specification, the adhesive composition may further include a cation initiator, a radical initiator, a photosensitizer and the like.

The cation initiator according to one embodiment of the present specification is a compound generating acids ($H^+$) by active energy rays, and the cation initiator capable of being used in the present disclosure preferably includes a sulfonium salt or an iodonium salt. Specific examples of the photoacid generator including a sulfonium salt or an iodonium salt may include one or more types selected from the group consisting of diphenyl(4-phenylthio)phenylsulfonium hexafluoroantimonate, diphenyl(4-phenylthio)phenylsulfonium hexafluorophosphate, (phenyl) [4-(2-methylpropyl) phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate, but are not limited thereto.

The radical initiator according to one embodiment of the present specification is for enhancing a curing rate by facilitating radical polymerization, and as the radical initiator, radical initiators generally used in the art may be used without limit.

Examples of the photosensitizer according to one embodiment of the present specification may include carbonyl compounds, organosulfur compounds, persulfates, redox-based compounds, azo and diazo compounds, anthracene-based compounds, halogen compounds, photoreductive dyes and the like, but are not limited thereto.

One embodiment of the present specification provides a polarizing plate including a polarizer; an adhesive layer provided on at least one surface of the polarizer and formed using the above-described adhesive composition; and a protective film provided on at least one surface of the adhesive layer.

FIG. 1 illustrates a laminated structure of a polarizing plate according to one embodiment of the present specification. FIG. 1 illustrates a structure of the polarizing plate in which an adhesive layer (2) is provided on one surface of a polarizer (1), and a protective film (3) is provided on one surface of the adhesive layer.

FIG. 2 illustrates a laminated structure of a polarizing plate according to one embodiment of the present specification. FIG. 2 illustrates a structure of the polarizing plate in which a first adhesive layer (4) and a second adhesive layer (5) are provided on both surfaces of a polarizer (1), a first protective film (6) is provided on one surface of the first adhesive layer, and a second protective film (7) is provided on one surface of the second adhesive layer.

The polarizer is not particularly limited, and polarizers well known in the art such as films formed with polyvinyl alcohol (PVA) including iodine or a dichroic dye may be used. The polarizer may be prepared by dyeing a PVA film with iodine or a dichroic dye, however, a preparation method thereof is not particularly limited. In the present specification, the polarizer means a state not including a protective film, and the polarizing plate means a state including a polarizer and a protective film.

Next, the adhesive layer is formed using the adhesive composition according to the embodiments of the present specification described above, and may be formed using methods well known in the art. For example, a method of forming the adhesive layer by coating the adhesive composition on one surface of a polarizer or a protective film, laminating the polarizer and the protective film, and then curing the result may be used. Herein, the coating may be performed using coating methods well known in the art such as spin coating, bar coating, roll coating, gravure coating or blade coating.

Meanwhile, the curing may be performed by photocuring, more specifically, irradiating active energy rays such as ultraviolet rays, visible rays, an electron beam and X-rays. For example, the curing may be performed using a method of irradiating ultraviolet rays of approximately 10 mJ/cm$^2$ to 2500 mJ/cm$^2$ using an ultraviolet irradiation device (metal halide lamp).

Alternatively, the curing may also be performed by thermal curing, more specifically, thermal curing at a curing temperature of 60° C. or higher. Herein, when thermal curing, known amine-based initiators may be further added as necessary in order to increase the curing rate.

Alternatively, the curing may be performing the thermal curing after the photocuring, or may be performing the photocuring after the thermal curing.

According to one embodiment of the present specification, the adhesive layer has a thickness of greater than 0 μm and less than or equal to 20 μm.

Specifically, the thickness is preferably greater than 0 μm and less than or equal to 10 μm, and more preferably from 0.1 μm to 10 μm or 0.1 μm to 5 μm. When the adhesive layer thickness is too small, uniformity and adhesive strength of the adhesive layer may decline, and the adhesive layer thickness being too large may cause a problem of producing wrinkles on the exterior of the polarizing plate.

According to one embodiment of the present specification, the protective film is for supporting and protecting a polarizer, and protective films made of various materials generally known in the art such as cellulose-based films, polyethylene terephthalate (PET) films, cycloolefin polymer (COP) films or acryl-based films may be used without limit. Among these, using acryl-based films is particularly preferred considering optical properties, durability, economic feasibility and the like.

Meanwhile, the acryl-based film capable of being used in the present specification may be obtained through molding a molding material including a (meth)acrylate-based resin as a main component by extrusion molding. Herein, the (meth)acrylate-based resin employs a resin including a (meth)acrylate-based unit as a main component, and is a concept including, as well as a homopolymer resin formed with a (meth)acrylate-based unit, a copolymer resin copolymerizing other monomer units in addition to the (meth)acrylate-based unit and a blend resin blending other resins to such a (meth)acrylate-based resin.

Meanwhile, the (meth)acrylate-based unit may be, for example, an alkyl (meth)acrylate-based unit. Herein, the alkyl (meth)acrylate-based unit means both an alkyl acrylate unit and an alkyl methacrylate unit, and the alkyl group of the alkyl (meth)acrylate-based unit preferably has 1 to 10 carbon atoms, and more preferably has 1 to 4 carbon atoms.

In addition, examples of the monomer unit copolymerizable with the (meth)acrylate-based unit may include a styrene-based unit, a maleic anhydride-based unit, a maleimide-based unit and the like. Herein, examples of the styrene-based unit may include, but are not limited to, styrene, α-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methyl maleimide, N-cyclohexyl maleimide, N-phenyl maleimide and the like. These may be used either alone or as a mixture thereof.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then film molding the result, or may be prepared by preparing an (meth)acrylate-based resin, other polymers, additives and the like as separate solutions, then forming a uniformly mixed solution by mixing the separately prepared solutions, and film molding the result. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

One embodiment of the present specification provides an image display device including a display panel; and the polarizing plate described above provided on one surface or both surfaces of the display panel.

The display panel may be a liquid crystal panel, a plasma panel and an organic light emitting panel.

Accordingly, the image display device may be a liquid crystal display device (LCD), a plasma display panel device (PDP) and an organic electroluminescent display device (OLED).

More specifically, the image display device may be a liquid crystal display device including a liquid crystal panel and polarizing plates each provided on both surfaces of this liquid crystal panel, and herein, at least one of the polarizing plates may be a polarizing plate including the polarizer according to one embodiment of the present specification described above. In other words, the polarizing plate has, in a polarizing plate including an iodine and/or dichroic dye-dyed polyvinyl alcohol-based polarizer and a protective film provided on at least one surface of the polyvinyl alcohol-based polarizer, a locally depolarized area with single body transmittance of 80% or greater in a 400 nm to 800 nm wavelength band, and the depolarized area has arithmetic mean roughness (Ra) of 200 nm or less, a polarization degree of 10% or less and sagging of 10 μm or less.

Herein, types of the liquid crystal panel included in the liquid crystal display device are not particularly limited. For example, known panels including passive matrix type panels such as a twisted nematic (TN) type, a super twisted nematic (STN) type, a ferroelectic (F) type or a polymer dispersed (PD) type; active matrix type panels such as a two terminal type or a three terminal type; in plane switching (IPS) type panels, vertical alignment (VA) type panels, and the like, may all be used without being limited in the type. In addition, other constitutions forming the liquid crystal display device, for example, types of upper and lower substrates (for example, color filter substrate or array substrate) and the like, are not particularly limited as well, and constitutions known in the art may be employed without limit.

Hereinafter, the present specification will be described in detail with reference to examples in order to specifically describe the present specification. However, the examples according to the present specification may be modified to various different forms, and the scope of the present specification is not to be construed as being limited to the examples described below. Examples of the present specification are provided in order to more fully describe the present specification to those having average knowledge in the art.

COMPARATIVE EXAMPLES 1 TO 3 AND EXAMPLES 1 TO 5

An adhesive composition was prepared in % by weight as described in the following Table 1.

2021P: 3',4'-epoxycyclohexylmethyl 3,4-epoxycyclohexane carboxylate
HDMDGE: 1,4-cyclohexane dimethanol diglycidyl ether
BPF: bisphenol F diglycidyl ether
OXT221: 3,3'-oxybis(methylene)bis(3-ethyloxetane)
OXT101: 3-ethyl-3-hydroxymethyloxetane
OXT212: 3-ethyl-3-(2-ethylhexyloxy)methyloxetane In addition, adhesive strength and thermal shock of the adhesive compositions prepared in Comparative Examples 1 to 3 and Examples 1 to 5 were measured and described in Table 1.

TABLE 1

| | Alicyclic Epoxy | Aliphatic Epoxy | Aromatic | Oxetane | | | Acryl Bare Film Adhesive Strength Shock (N/2 cm) Peel Strength | | Water Resistance (60° C.*24 h) | | Thermal Shock |
|---|---|---|---|---|---|---|---|---|---|---|---|
| | 2021 P | CHDM DGE | Epoxy BPF | OXT 221 | OXT 101 | OXT 212 | PVA UP | ACR UP | PVA UP | ACR UP | |
| Comparative Example 1 | 30% | 20% | — | 5% | 5% | 40% | Excellent | Excellent | Poor | Poor | Poor |
| Comparative Example 2 | 30% | 15% | 5% | 5% | 5% | 40% | Excellent | Excellent | Poor | Poor | Poor |
| Examples 1 | 30% | 10% | 10% | 5% | 5% | 40% | Excellent | Excellent | Favorable | Excellent | Favorable |
| Examples 2 | 30% | 5% | 15% | 5% | 5% | 40% | Excellent | Excellent | Favorable | Excellent | Excellent |
| Examples 3 | 30% | — | 20% | 5% | 5% | 40% | Excellent | Excellent | Favorable | Excellent | Excellent |
| Examples 4 | 25% | — | 25% | 5% | 5% | 40% | Excellent | Excellent | Excellent | Excellent | Excellent |
| Examples 5 | 20% | — | 30% | 5% | 5% | 40% | Favorable | Excellent | Favorable | Excellent | Favorable |
| Comparative Example 3 | 10% | — | 40% | 5% | 5% | 40% | Favorable | Excellent | Poor | Poor | Poor |

In Table 1, it was seen that effects of excellent adhesive strength and thermal shock were obtained when satisfying the aromatic epoxy content of the present specification.

<Method of Evaluating Peel Strength of Polarizing Plate>

Peel strength of the polarizer and the polymer film was measured. As for the peeling experiment, peel strength when peeled off at a rate of 300 m/min and 90° was measured using a polarizing plate having a width of 20 mm and a length of 100 mm. Peel strength being greater than 2 N/2 cm was expressed as excellent, from 1 N/2 cm to 2 N/2 cm as favorable, and less than 1 N/2 cm as poor.

PVA UP: acrylic film fixed, and PVA film peeled off
ACR UP: PVA film fixed, and acrylic film peeled off <Method of Evaluating Water Resistance>

After laminating a polarizing plate on a glass substrate (glass lamination), the result was immersed in a 60° C. thermostat. After 24 hours, peel strength between the polarizer and a polymer film was measured. The measurement method is the same as the polarizing plate peel strength evaluation.

<Method of Evaluating Thermal Shock>

After laminating a polarizing plate on a glass substrate (glass lamination), the result was left unattended for 30 minutes at −40° C. and then left unattended again for 30 minutes at 70° C., and this was repeated 100 times. Then, changes in the exterior of the polarizing plate was visually evaluated. Having cracks of 2 mm or less only at the end of the polarizing plate exterior was expressed as excellent, identifying cracks of a short line of 5 mm or greater other than the end as favorable, and having a number of cracks on the whole polarizing plate surface as poor.

COMPARATIVE EXAMPLES 4 TO 9, EXAMPLES 4 AND 6

An adhesive composition was prepared in % by weight as described in the following Table 2.

In addition, adhesive strength and thermal shock of the adhesive compositions prepared in Comparative Examples 4 to 9 and Examples 4 to 6 were measured and described in Table 2.

TABLE 2

| | Alicyclic Epoxy | Aromatic | Oxetane | | | Acryl Bare Film Adhesive Strength Shock (N/2 cm) Peel Strength | | Water Resistance (60° C.*24 h) | | Thermal Shock |
|---|---|---|---|---|---|---|---|---|---|---|
| | 2021 P | Epoxy BPF | OXT 221 | OXT 101 | OXT 212 | PVA UP | ACR UP | PVA UP | ACR UP | |
| Examples 4 | 25% | 25% | 5% | 5% | 40% | Excellent | Excellent | Excellent | Excellent | Excellent |
| Comparative Example 4 | 25% | 25% | 10% | — | 40% | Poor | Excellent | Poor | Poor | Excellent |
| Comparative Example 5 | 25% | 25% | — | 10% | 40% | Favorable | Excellent | Poor | Poor | Poor |
| Comparative Example 6 | 25% | 25% | 10% | 5% | 35% | Favorable | Excellent | Poor | Favorable | Poor |

TABLE 2-continued

| | Alicyclic Epoxy | Aromatic | Oxetane | | | Acryl Bare Film Adhesive Strength Shock (N/2 cm) Peel Strength | | Water Resistance (60° C.*24 h) | | |
|---|---|---|---|---|---|---|---|---|---|---|
| | 2021 P | Epoxy BPF | OXT 221 | OXT 101 | OXT 212 | PVA UP | ACR UP | PVA UP | ACR UP | Thermal Shock |
| Comparative Example 7 | 25% | 25% | 5% | 10% | 35% | Favorable | Excellent | Poor | Favorable | Poor |
| Comparative Example 8 | 55% | 25% | 5% | 5% | 10% | Poor | Poor | Poor | Poor | Excellent |
| Examples 6 | 40% | 25% | 5% | 5% | 25% | Favorable | Excellent | Favorable | Excellent | Excellent |
| Comparative Example 9 | 5% | 25% | 5% | 5% | 60% | Poor | Poor | Poor | Poor | Poor |

In Table 2, it was seen that effects of excellent adhesive strength and thermal shock were obtained when satisfying the oxetane compound content of the present specification.

COMPARATIVE EXAMPLE 1, EXAMPLES 3 AND 7 TO 9

An adhesive composition was prepared in % by weight as described in the following Table 3.
BPA: bisphenol A diglycidyl ether
PGE: phenyl glycidyl ether
t-BPGE: 4-tert-butylphenyl glycidyl ether
In addition, adhesive strength of the adhesive compositions prepared in Comparative Example 1, and Examples 3 and 7 to 9 was measured and described in Table 3.

TABLE 3

| | Alicyclic Epoxy | Aliphatic Epoxy | Aromatic Epoxy | | | Oxetane | | | Acryl Bare Film Adhesive Strength Shock (N/2 cm) Peel Strength | | Water Resistance (60° C.*24 h) | |
|---|---|---|---|---|---|---|---|---|---|---|---|---|
| | 2021 P | CHDM DGE | BPF | BPA | PGE | t-BPGE | OXT 221 | OXT 101 | OXT 212 | PVA UP | ACR UP | PVA UP | ACR UP |
| Comparative Example 1 | 30% | 20% | — | — | — | — | 5% | 5% | 40% | Excellent | Excellent | Poor | Poor |
| Examples 3 | 30% | — | 20% | — | — | — | 5% | 5% | 40% | Excellent | Excellent | Favorable | Excellent |
| Examples 7 | 30% | — | — | 20% | — | — | 5% | 5% | 40% | Excellent | Excellent | Favorable | Excellent |
| Examples 8 | 30% | — | — | — | 30% | — | 5% | 5% | 30% | Excellent | Excellent | Excellent | Excellent |
| Examples 9 | 30% | — | — | — | — | 30% | 5% | 5% | 30% | Excellent | Excellent | Excellent | Excellent |

In Table 3, it was seen that effects of excellent adhesive strength were obtained when including the aromatic epoxy compound of the present specification.

REFERENCE NUMERAL

1: Polarizer
2, 4, 5: Adhesive Layer
3, 6, 7: Protective Film

The invention claimed is:
1. An adhesive composition comprising:
3-ethyl-3-(2-ethylhexyloxy) methyloxetane;
3-ethyl-3-hydroxymethyloxetane;
3,3'-oxybis(methylene)bis(3-ethyloxetane);
an aromatic epoxy compound; and
an alicyclic epoxy compound,
wherein the 3-ethyl-3-(2-ethylhexyloxy)methyloxetane is present in an amount of 20 parts by weight to 50 parts by weight, the 3-ethyl-3-hydroxymethyloxetane is present in an amount of 2 parts by weight to 8 parts by weight, the 3,3'-oxybis(methylene)bis(3-ethyloxetane) is present in an amount of 2 parts by weight to 8 parts by weight, the aromatic epoxy compound is present in an amount of 7 parts by weight to 38 parts by weight, and the alicyclic epoxy compound is present in amount of 10 parts by weight to 50 parts by weight, based on 100 parts by weight of the adhesive composition.
2. The adhesive composition of claim 1, wherein the aromatic epoxy compound is one or more selected from the group consisting of novolac-based epoxy, bisphenol A-based epoxy, bisphenol F-based epoxy, brominated bisphenol-based epoxy, phenyl glycidyl ether, o-cresyl glycidyl ether, and nonylphenyl glycidyl ether.
3. The adhesive composition of claim 1, further comprising an aliphatic epoxy compound.
4. The adhesive composition of claim 3, wherein the aliphatic epoxy compound is one or more selected from the group consisting of 1,4-cyclohexane dimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylol propane triglycidyl ether, n-butyl glycidyl ether, and 2-ethylhexyl glycidyl ether.
5. The adhesive composition of claim 3, wherein the aliphatic epoxy compound is present in an amount of 1 parts by weight to 30 parts by weight, based on 100 parts by weight of the adhesive composition.
6. The adhesive composition of claim 1, wherein the alicyclic epoxy compound is one or more selected from the group consisting of 3',4'-epoxycyclohexylmethyl-3,4-epoxycyclohexane carboxylate, vinylcyclohexene dioxide, dicyclopentadiene dioxide, and bisepoxycyclopentyl ether.

7. A polarizing plate, comprising:

a polarizer;

an adhesive layer disposed on at least one surface of the polarizer, wherein the adhesive layer is formed using the adhesive composition of claim 1; and a protective film disposed on at least one surface of the adhesive layer.

8. The polarizing plate of claim 7, wherein the adhesive layer has a thickness of greater than 0 μm and less than or equal to 20 μm.

9. The polarizing plate of claim 7, wherein the protective film is an acryl-based film.

10. An image display device comprising:

a display panel; and the polarizing plate of claim 7 disposed on one surface or both surfaces of the display panel.

* * * * *